(No Model.)

E. D. MOORE.
MAIL BAG.

No. 398,529. Patented Feb. 26, 1889.

Witnesses:
Ben. F. Boyden.
Chas. W. Smiley.

Inventor:
Everett D. Moore
By Boyden, Bailie & Mason
Atty.

UNITED STATES PATENT OFFICE.

EVERETT D. MOORE, OF BALTIMORE, MARYLAND, ASSIGNOR TO THOMAS C. CHAPPELL, OF SAME PLACE.

MAIL-BAG.

SPECIFICATION forming part of Letters Patent No. 398,529, dated February 26, 1889.

Application filed June 3, 1886. Renewed December 24, 1887. Serial No. 258,910. (No model.)

*To all whom it may concern:*

Be it known that I, EVERETT D. MOORE, of Baltimore city, State of Maryland, have invented certain new and useful Improvements in Mail-Bags, of which the following is a specification.

My invention relates to improvements in mail-bags, satchels, traveling-bags, &c., as illustrated in the accompanying drawings, in which—

Figure 1:
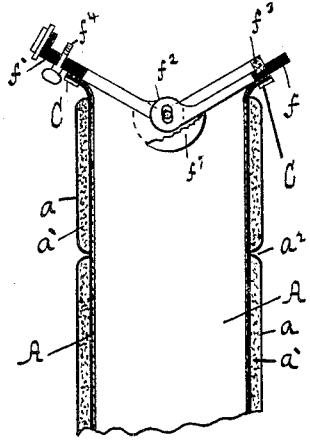
Figures 2, 3:
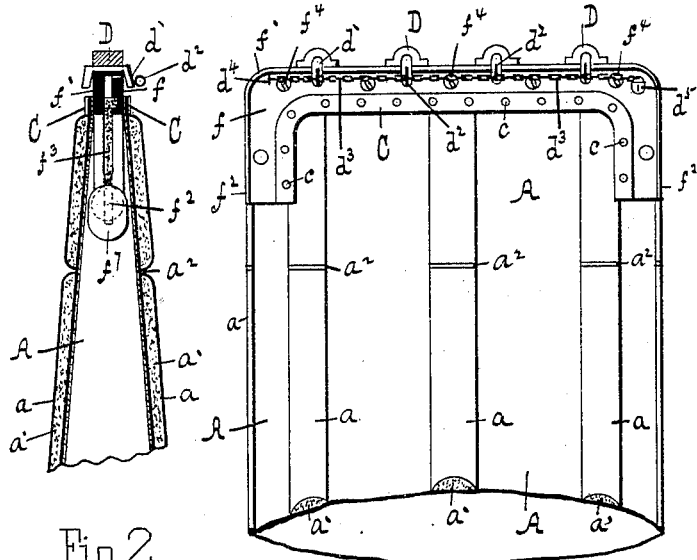
Figures 4, 5:
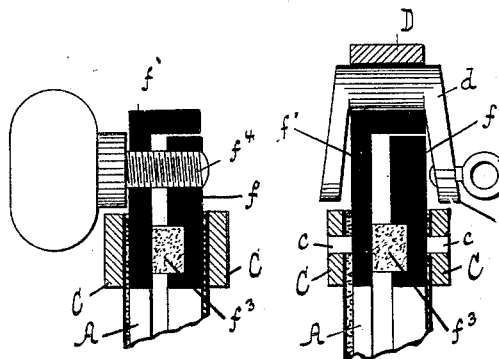
Figure 6:
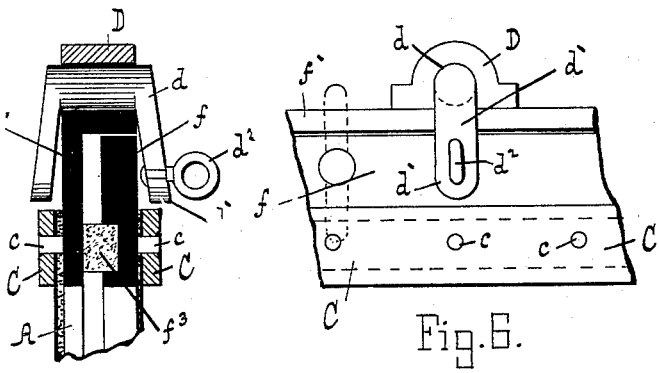
Figure 7:
Figure 8:

Figure 1 is a cross-section through the bag, showing the same opened; Fig. 2, a cross-section showing the bag closed; Fig. 3, a front elevation; Fig. 4, an enlarged cross-section of the frame in detail, showing the clamping-screws; Fig. 5, an enlarged cross-section of the frame in detail, showing the sealing device; Fig. 6, a front elevation of a portion of the frame, showing the sealing device; Fig. 7, a sectional view through the hinge; Fig. 8, a sectional view through the hinge at right angles to Fig. 7.

Similar letters refer to similar parts throughout the several views.

The letter A designates the body or bag, which is made in any desired shape or size; and it consists of oiled canvas, rubber-covered canvas, or any suitable material that is water-proof, by which the mails contained therein are prevented from getting destroyed or damaged by being in contact with any water which the bag may be subject to either from shipwreck or otherwise.

In view of the fact that a bag coated with rubber deposits moisture on the inside when hermetically sealed, and when used for the letters and addressed parcels the stamps are liable to be thus moistened and come off and the address on the letters and parcels bleared, I preferably employ a material water-proof with some other material than rubber. I also preferably attach the floats or circles to said bag nearer to that end on which the mouth or opening is situated, so as to keep this end upward and out of the water. The amount of cork and floats employed may vary in view of the weight of the parcels to be transmitted, and I preferably place the same either perpendicularly on the sides in small separate pockets or around the circumference of the bag at right angles to a line drawn through it from its mouth to its opposite end in a pocket, my object being to make the said bag as light in weight as possible and at the same time water-proof and buoyant.

The mouth of the bag may be sealed, as follows: The mouth or opening of the bag A is provided with the frames $f$ and $f'$, hinged at $f^2$. The canvas or body of the said bag A is secured to the frames $f$ and $f'$ by means of the binding-plates C C, the said binding-plates being tightly riveted to the frames $f$ and $f'$ by means of the rivet $c$, with the material of the body of the bag therebetween, thus making a water-tight joint between the said frames $f$ and $f'$ and the body of the bag A. The frame $f$ is provided with a slot to hold the gasket $f^3$, which is made of rubber or some suitable elastic material, and extends the full length of the frame from hinge to hinge. The said gasket $f^3$ is made sufficiently thick to project beyond the surface of the frame $f$, and forms a seat for the frame $f'$. The frame $f$ is provided with holes that are threaded to suit the clamping-screws $f^4$, which work freely in the frame $f'$, whereby the said frames may be drawn together, the frame $f$ pressing upon the gasket $f^3$, and thus forming a water-tight joint. In order that a uniform pressure may be brought upon all parts of the gasket $f^3$ by the frames $f$ and $f'$, the hinges $f^2$ are constructed with their longer or central parts slotted, as represented in Figs. 7 and 8, thus permitting the said hinges to accommodate themselves to any thickness of the gasket. The hinges $f^2$ are further provided with the wings $f^6$, in order that a broad surface may be brought to bear upon the gasket $f^3$ at this point.

To guard against leakage about the hinges $f^2$, the hinges are incased within the pockets $f^7$, the said pockets $f^7$ being sewed to the body of the bag A and securely clamped to the frames $f$ and $f'$.

To the top of the frame $f'$ are riveted the binders D, in which turn the clamps $d$, with their arms $d'$ slightly inclined and extending on either side of the frame $f'$, which, when the clamps are down, as shown in Fig. 5, draw the frames $f$ and $f'$ together and prevent their separation. In one of the arms $d'$ of the clamps $d$ are fixed the eyelets $d^2$, through which is passed the chain $d^3$, the said chain $d^3$ being secured at one side of the frame by means of the staple $d^4$ and at the other side of the frame by the lock $d^5$. Thus when the clamps $d$ are drawn and the chains $d^3$ passed through the eyelets $d^2$ and secured by the lock $d^5$ the bag is securely locked, and can only be opened by the removal or slackening of the chain, which will permit the clamps $d$ to be lifted and the bag unsealed.

To the bag or body A are sewed the pockets $a$, which are packed with cork, $a'$, or some material of sufficiently light specific gravity to render the bag buoyant under all circumstances. The pockets may be vertical or horizontal, may extend entirely around the bag or partially, and may be made distinct from one another or connected and jointed, so as to admit of folding, the object being to so locate the pockets and arrange them that the bag may be easily folded into a compact parcel for transportation when empty. At certain intervals in the pockets $a$ occur the breaks $a^2$, which permit the bag to be folded and closely stored without injury to the said cork or pocket. By this construction the bag, in case of shipwreck, may be cast overboard and float the mails contained therein, which may then be recovered by a passing vessel or by being washed ashore, and, further, by means of their having sufficient buoyancy, serve as life-preservers to the shipwrecked passengers and crew.

In using the said bag when the mails are placed in it, the opening is closed by bringing the frame together and drawing its two parts together by the clamps $d$, after which the screws $f^4$ are screwed up, which tightly binds the said two parts of the frame together and makes the opening water-tight. The chain $d^3$ is then placed in the eyelets $d^2$ and tightly drawn across the frame and locked thereto, which prevents the bag from being opened by any one except the proper person. The bag is then ready for shipment.

Having described my invention, what I claim, and wish to secure by United States Letters Patent, is—

1. In a bag for the transportation of the mails, a bag made of water-proof material, combined with independent pockets containing cork or other similar material, which are so located as to permit of the bag being folded, said bag combined with mechanism for hermetically sealing the mouth of the bag, substantially as described.

2. In a bag for transportation of mails, a bag made of water-proof material, combined with independent pockets containing cork or other similar material, which are so located as to permit of the bag being folded.

3. In a bag for the transportation of mails, the combination of a water-proof sack, the mouth of said sack formed by two frames hinged one to the other, the joint forming the hinges of said frames provided with a slot to admit of self-adjustment, a gasket placed between the said frames, wings extended from the said frames at the joints thereof for bearing-surfaces of said gasket, and screws for drawing the said frames together, for the purpose set forth.

4. In a bag for the transportation of mails, the combination of a water-proof sack, the mouth of said sack formed by two frames hinged one to the other, the joint forming the hinges of said frames provided with a slot for self-adjustment, a gasket placed between the said frames, wings extended from the said frames at the joints thereof for bearing-surfaces of said gasket, screws for drawing said frames together, binders pivoted to said frame for securing the said frames in the closed position, and means for locking the said binders in the closed position, for the purpose set forth.

5. In a bag for the transportation of mails, the combination of a water-proof sack provided with pockets around the sides thereof, in which is placed cork or some like buoyant substance, the mouth of said sack formed by two frames hinged one to the other, the joint forming the hinges of said frames provided with a slot for self-adjustment, a gasket placed between the said frames at the joints thereof for bearing-surfaces of said gasket, screws for drawing said frames together, binders pivoted to said frames for securing the said frames in the closed position, and a cord or chain for locking said binders in the closed position, substantially as shown, and for the purpose set forth.

EVERETT D. MOORE.

Witnesses:
J. MASON GOSZLER,
JNO. T. MADDOX.